United States Patent [19]

Schaldach

[11] Patent Number: 4,617,847
[45] Date of Patent: Oct. 21, 1986

[54] BAR PULLER

[76] Inventor: Kurt Schaldach, 5826 Kings Hwy., Parma Heights, Ohio 44130

[21] Appl. No.: 679,692

[22] Filed: Dec. 10, 1984

[51] Int. Cl.⁴ .............................................. B23B 13/12
[52] U.S. Cl. ........................................... 82/2.5; 414/14
[58] Field of Search .................... 82/2.5, 2.7; 414/14–18, 20

[56]  References Cited

U.S. PATENT DOCUMENTS

| 932,394 | 8/1909 | Johnson | 414/14 |
| 3,582,000 | 6/1971 | Werkmeister et al. | 414/14 |
| 4,404,878 | 9/1983 | Blanchard | 82/2.5 |
| 4,464,958 | 8/1984 | Luks | 82/2.5 |

FOREIGN PATENT DOCUMENTS

| 7708993 | 3/1979 | Sweden | 82/2.5 |
| 622197 | 3/1981 | Switzerland | 82/2.5 |

*Primary Examiner*—Francis S. Husar
*Assistant Examiner*—Jerry Kearns
*Attorney, Agent, or Firm*—Woodling, Krost & Rust

[57] ABSTRACT

A bar puller for use for example on chuck type bar stock machines which includes in combination a mounting member for normal attachment to the turret of the machine. First and second jaw members are pivotally mounted to the mounting member for movement between first and second positions and each jaw member has a facing stock engaging surface to engage a piece of bar stock. Spring means constantly urge the jaws toward the first position so as to grip a piece of bar stock when the bar stock is held by the engaging surface.

7 Claims, 7 Drawing Figures

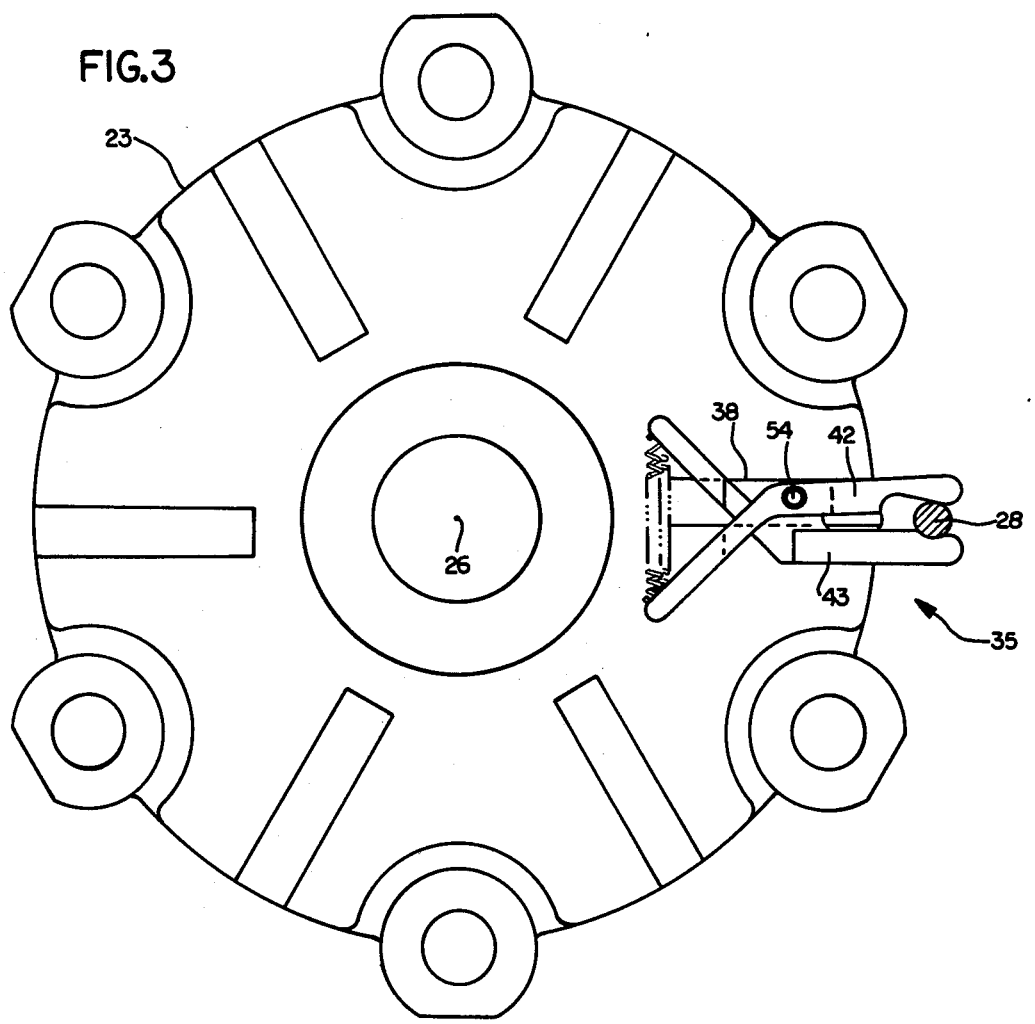
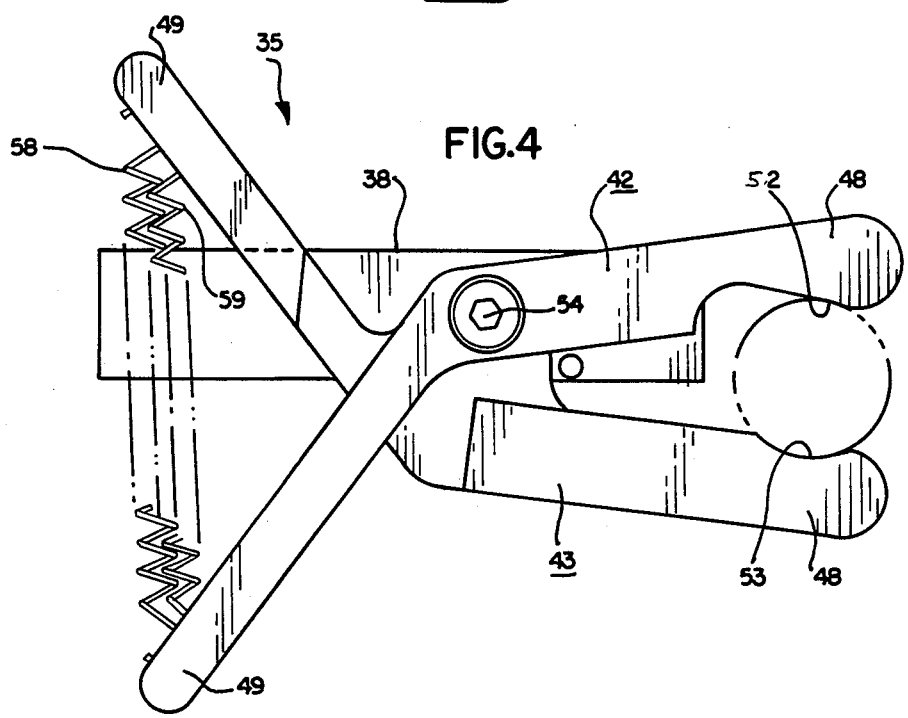

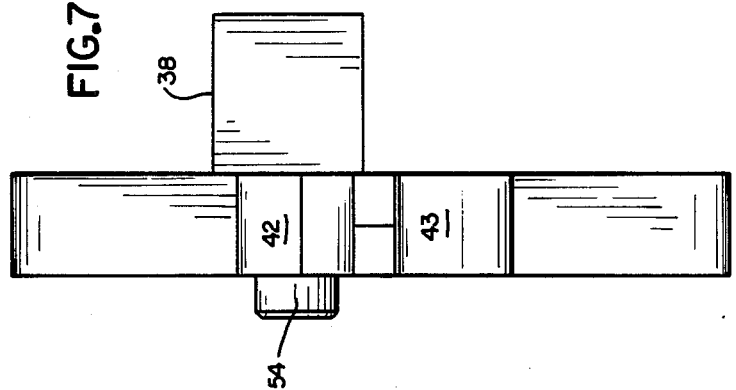
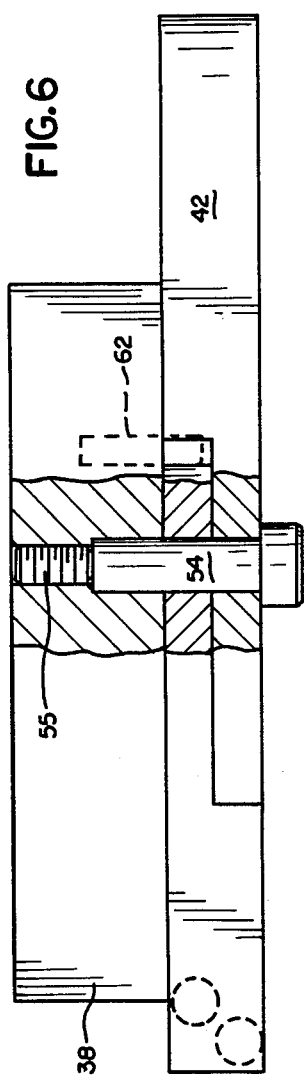
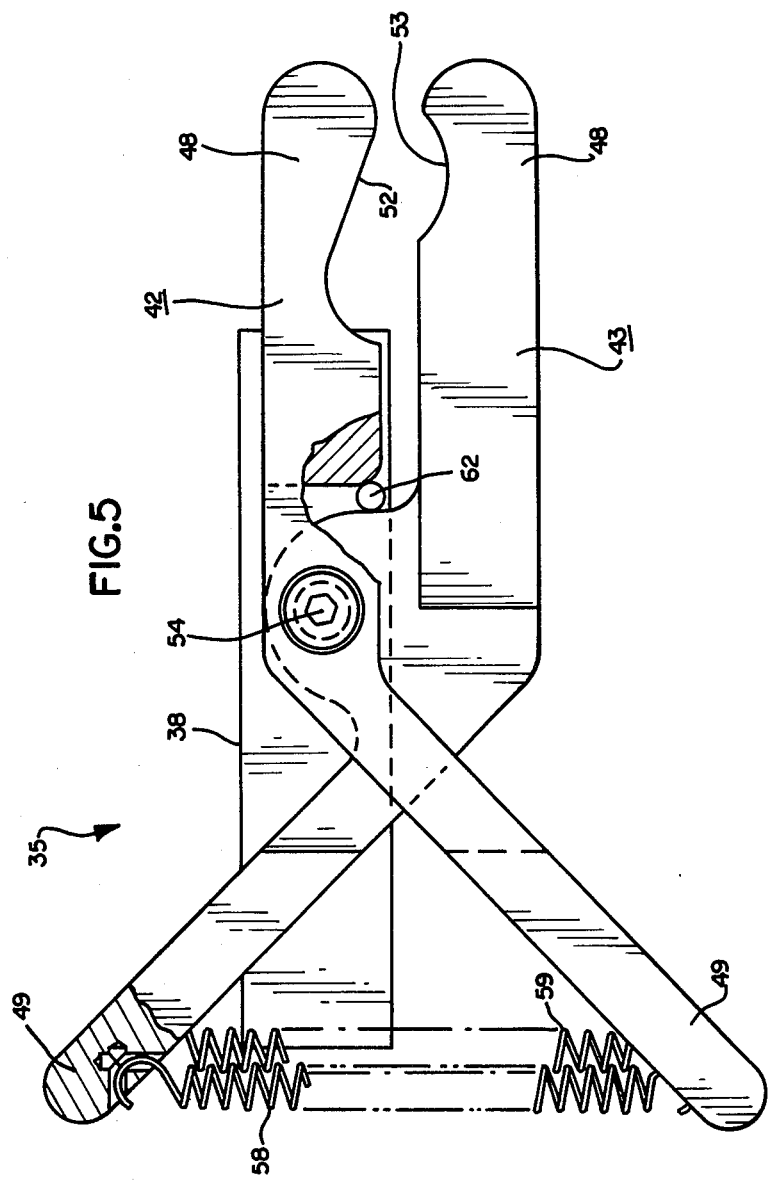

BAR PULLER

The present invention relates in general to bar pullers and more specifically to such devices which are of scissor-like configuration with jaws that are adapted to move over a piece of bar stock in a direction generally radially of the stock to a position to grip the stock.

Multi tooled turning machines of the prior art include for example chucking machines having a chuck through which is fed a piece of bar stock of given cross section for example rectangular, hexagonal, triangular or circular. The stock is moved a desired length beyond the chuck, is gripped by the chuck, various machining operations are performed on the stock by tools usually carried by a turret which is movable rotationally, axially and laterally with respect to the stock. Thereafter the machined piece is severed from the stock by a parting tool carried at one of the turret positions. It is then necessary to move the stock another increment so that the machining operations may be repeated to produce another machined piece.

The prior art has included collet type devices to pull the stock a given increment. These collets are carried at one of the turret positions and the turret is maneuvered so as to move the collet axially over the end of the stock. With the chuck released the turret carrying the collet which is holding the stock is moved axially so as to pull the stock a desired axial increment. The disadvantage with this type of prior art device is that a different collet is required with each stock size and the axial distance the stock can be moved in a given operation is limited.

It is therefore an object of the present invention to provide a bar puller that can handle a wide range of bar stock sizes and shapes and which maximizes the axial distance bar stock can be moved in a given pulling operation.

Another object of the present invention is to provide a bar puller which is adapted to be mounted to a turret position and which is moved into position by the turret to grip the stock in a generally radial direction of the stock as distinguished from an axial direction.

A still further object of the invention is to provide a bar puller which includes first and second jaw members each of which is pivotally mounted at an intermediate portion with stock engaging surfaces on one end of the members and spring means acting on another end of the members to constantly urge the jaw members to closed position.

Other objects and a fuller understanding of this invention may be had by referring to the following description and claims, taken in conjunction with the accompanying drawings, in which:

FIG. 3 is a view taken generally along the line 3—3 of FIG. 2;

FIG. 4 is an enlarged elevational view of the bar puller of the present invention taken in the direction of FIG. 3;

FIG. 5 is a view similar to FIG. 4 but somewhat enlarged and partially in section showing the jaw members in their most closed position;

FIG. 6 is a plan view of FIG. 5; and

FIG. 7 is an end view of FIG. 5.

Figure 1:
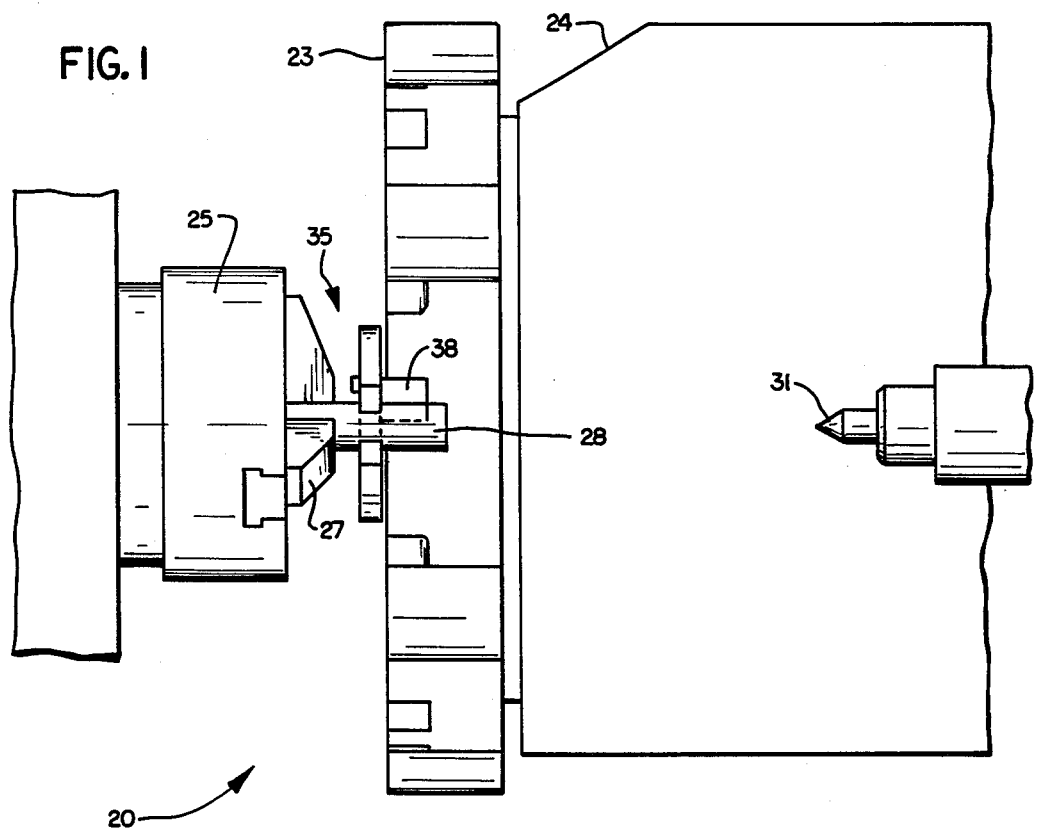
FIG. 1 is a schematic elevational view of a portion of a chucking machine illustrating, the teachings of the present invention.

The bar puller of the present invention has been illustrated as used in a chucking machine 20 shown only partially herein. The machine 20 includes a turret 23 carried by a mounting carriage 24 which is movable in all directions so as to appropriately position the turret. The turret 23 is rotatable about axis 26 so as to position any one of its tool positions (12 shown in FIG. 4) with respect to a workpiece. A chuck 25 with jaws 27 is included in the machine 20 and is adapted to move between open and closed positions to grip a piece of bar stock 28 of indefinite length. Also illustrated in the machine 20 is a tail stock 31 which serves the function of supporting one end of a length of bar stock which is to be subjected to various machining operations.

The bar puller of the invention has been indicated generally by the reference numeral 35 and includes a mounting block 38 which is conventionally secured in the turret position shown in the drawings. The device includes first and second jaw members 42, 43 respectively each having first and second end portions 48, 49 and an intermediate portion therebetween. The first end portions of the jaw members extend generally parallel and coextensively and have facing surfaces on which are formed stock engaging surfaces 52 and 53 respectively.

The intermediate portions of members 42, 43 have aligned bores through which a threaded point member 54 extends which is secured by threads 55 to block 38 and this serves to pivotally mount the jaw members for pivotal movement to perform their gripping function. The second end portions of the jaw members in effect cross each other as shown and diverge as they extend from the intermediate portions. Tension spring members 58 and 59 extend between the extreme ends of the respective second end portions 49 and constantly urge the jaw members toward a closed or gripping position. A locating pin 62 extends outwardly from block 38 between jaw members 42 and 43 to prevent the bar puller from rotating as a unit relative to the mounting block 38.

In operation of the present invention the bar puller 35 is mounted on the turret 23 as described hereinabove. A length of bar stock is inserted into the machine spindle with the chuck jaws open and pulled by hand out to some given length as shown in FIG. 1. The cycle start button of the machine is depressed to start the automatic function of the machine.

The turret then indexes and moves to a position relative to the bar stock which places the bar stock just beyond the extreme ends of portions 48. Relatively speaking the bar stock would be horizontally to the right of the positions shown in FIGS. 3 and 4. The turret then moves in a direction toward the bar stock which can be described as radial with respect thereto which forces the jaws to open against the bias of springs 58, 59 whereupon the bar stock is received by surfaces 52 and 53.

Figure 2:
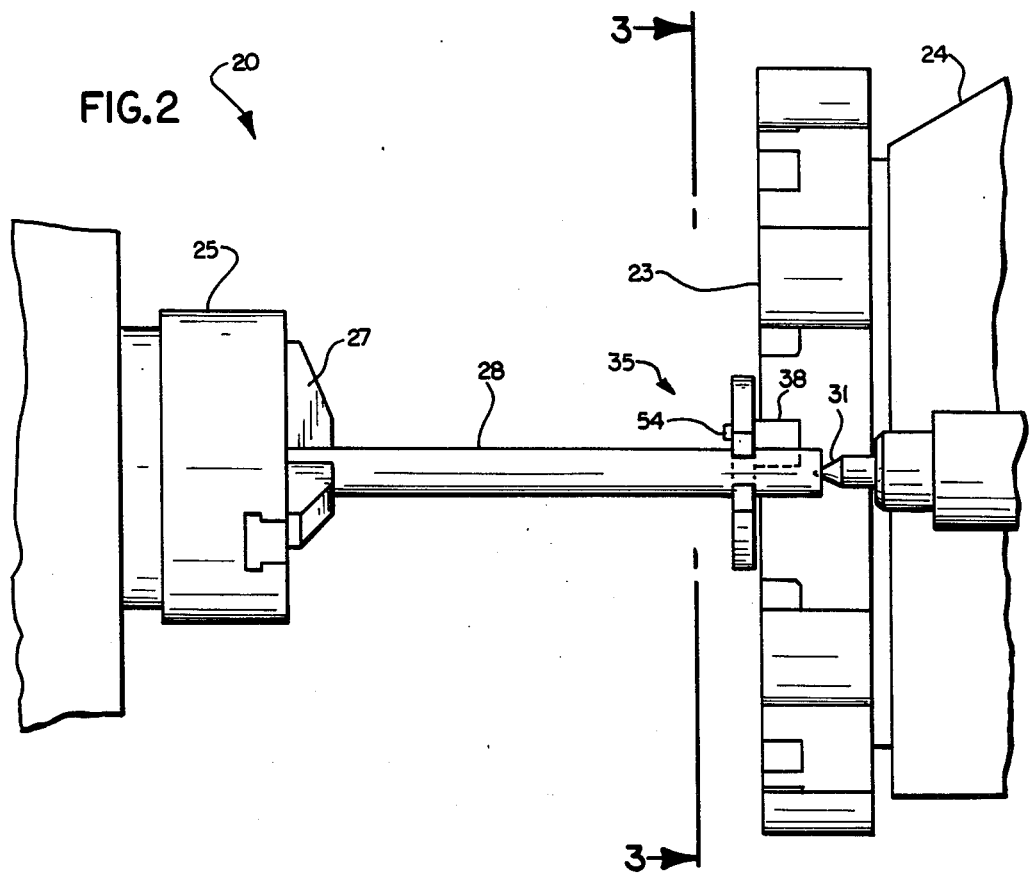
FIG. 2 is a view similar to FIG. 1 but showing the parts in a different position.

The chuck jaws are next released and the turret moves to the position of FIG. 2 which positions the end of the workpiece on the tail stock 31. The turret is then moved away from the bar stock which removes the jaw members from the stock in a direction opposite that in which engagement was effected.

The turret then automatically indexes a number of tools relative to the workpiece to perform the machining operations necessary to complete the piece with a parting tool severing the machined piece from the bar stock. The sequence of operations is then repeated.

It will be appreciated by those skilled in the art that the bar puller may pull the bar stock a shorter axial distance than that described as when shorter workpieces are machined and a tail stock type support is not required. The configuration of surfaces 52 and 53 and particularly 52 are such that polygonal shapes can be easily accommodated. The springs 58, 59 provide the correct force to enable the jaw members to open to receive the bar stock and yet move the bar stock axially when the turret is appropriately moved and the chuck jaws are released.

It can thus be seen that the objects of the invention are conveniently carried out in that the bar puller disclosed can accommodate a wide range of bar stock sizes and shapes and because of its design can move bar stock a maximum axial length.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bar puller for use on a chuck type bar stock machine which has a rotatable, multi tool position turret capable of moving in directions parallel to and laterally relative to the axis of the chuck or bar stock being handled by the machine including in combination a mounting block adapted to be fixedly secured in a given tool position of the turret, first and second jaw members each having first and second end portions and an intermediate portion, said first end portions of said jaw members extending generally parallel and coextensively and having facing surfaces upon which are formed stock engaging surfaces, pivot means pivotally connecting said first and second jaw members at said intermediate portions to said mounting block, to enable said first and second jaw members to move between open and closed positions, said jaw members crossing each other at said intermediate portions and said second end portions diverging from each other as said second end portions extend from said intermediate portions, and tension spring means extending between said second end portions of said jaw members constantly urging said jaw members to closed positions.

2. A bar puller as claimed in claim 1 wherein a locating pin extends from said mounting block and is engageable with said jaw members to orient said jaw members relative to said mounting block.

3. A bar puller for use on a bar stock machine including in combination a mounting member, first and second jaw members, said jaw members having stock engaging surfaces, pivot means mounting said jaw members to said mounting member whereby said jaw members are movable between first and second positions, means constantly urging said jaw members toward said first position which is a non-stock engaging position whereat said stock engaging surfaces are a given distance apart, said jaw members having rounded surfaces on their extreme ends to permit movement of said jaw members onto a piece of bar stock in a direction of travel generally radial of the piece of bar stock to said second position whereat said stock engaging surfaces are a distance apart greater than said given distance.

4. A bar puller as claimed in claim 2 wherein said pivot means resides out of a plane extending through the axis of the turret and the axis of the chuck or bar stock.

5. A bar puller for use on a bar stock machine including first and second jaw members each having first and second end portions and an intermediate portion, pivot means pivotally mounting said jaw members for pivotal movement between first and second positions, said first end portions of said jaw members having stock engaging surfaces on facing sides thereof adapted to engage circumferentially spaced portions of a piece of bar stock, means constantly urging said jaw members toward said first position which is non-stock engaging position whereat said stock engaging surfaces are a given distance apart, wall means on the extreme ends of said first end portions of said first and second jaw members presenting a generally rounded appearance to permit engagement of said jaw members with a piece of bar stock in a direction of travel generally radial of the bar stock thereby causing opening of said jaw members to said second position against said constantly urging means whereat said stock engaging surfaces are a distance apart greater than said given distance and said bar stock is received by said stock engaging surfaces.

6. A bar puller as claimed in claim 5 wherein said means constantly urging said jaw members toward said first position comprises a spring member extending between said second end portions of said first and second jaw members.

7. A bar puller as claimed in claim 6 wherein a mounting member is provided which receives and supports said pivot means and means supported by said mounting member to prevent said first and second jaw members from rotating as a unit about said pivot means.

* * * * *